United States Patent [19]

Byberg et al.

[11] 4,026,018

[45] May 31, 1977

[54] CUTTING TOOL FOR COAXIAL CABLE

[75] Inventors: Bjarne I. Byberg, Walnut Creek; Robert B. Kientz, Orinda, both of Calif.

[73] Assignee: Benner-Nawman, Inc., Pleasant Hill, Calif.

[22] Filed: May 10, 1976

[21] Appl. No.: 684,576

[52] U.S. Cl. .................................. 30/254; 30/94
[51] Int. Cl.² .................. B23B 13/06; B26D 3/16
[58] Field of Search ............ 30/254, 257, 251, 252, 30/259, 261, 92, 93, 94, 95, 228; 7/5.6

[56] References Cited

UNITED STATES PATENTS

| | | | |
|---|---|---|---|
| 514,254 | 2/1894 | Brady | 30/259 |
| 589,101 | 8/1897 | Scholes | 30/94 |
| 2,794,250 | 6/1957 | Bethune | 30/254 |
| 2,925,652 | 2/1960 | Lundquist | 30/254 X |
| 3,012,321 | 12/1961 | Townshend | 30/254 X |
| 3,059,334 | 10/1962 | Joers | 30/228 |
| 3,461,555 | 8/1969 | Bliznak | 30/254 |
| 3,922,780 | 12/1975 | Green | 30/228 X |

*Primary Examiner*—James L. Jones, Jr.
*Assistant Examiner*—J. C. Peters
*Attorney, Agent, or Firm*—Harris Zimmerman

[57] ABSTRACT

A plier-type cutting tool for cutting coaxial cables without deforming the cable includes a pair of longitudinally extending members joined by a common pivot member disposed near the jaw ends of the tool. Each jaw includes a pair of opposed, obliquely related cutting edges with a third cutting edge extending between the oblique pair in concave configuration. The oblique cutting edge nearest the open end of each jaw is sharpest, and is provided for cutting the insulation and outer tube of a coaxial cable. The third cutting edge of each jaw is harder and not as sharp, and is provided for severing the inner conductor of the cable.

3 Claims, 7 Drawing Figures

U.S. Patent  May 31, 1977  4,026,018
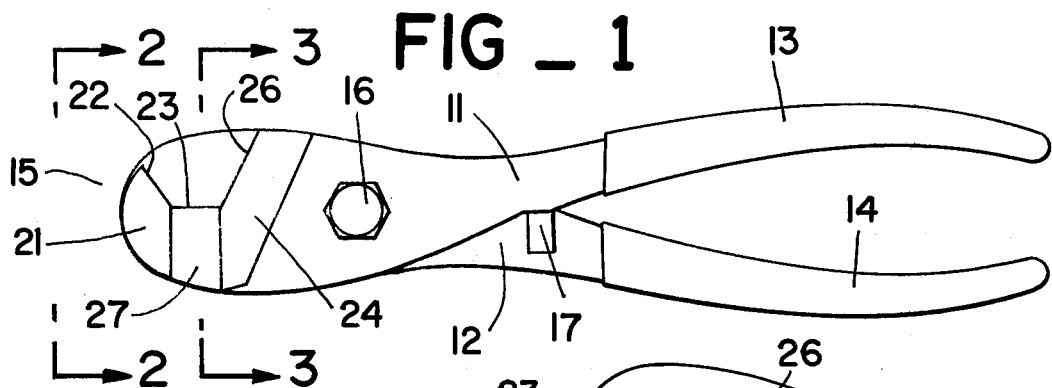
FIG_1
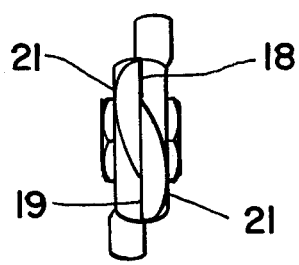
FIG_2
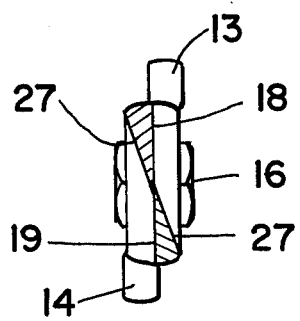
FIG_3
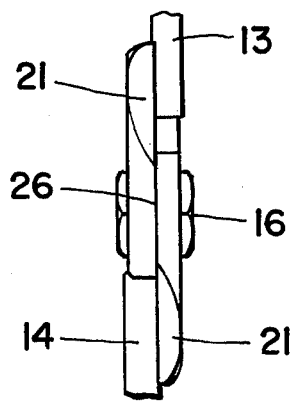
FIG_6
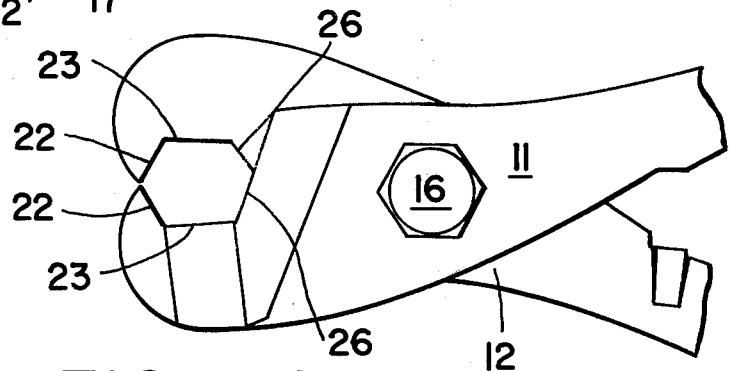
FIG_4
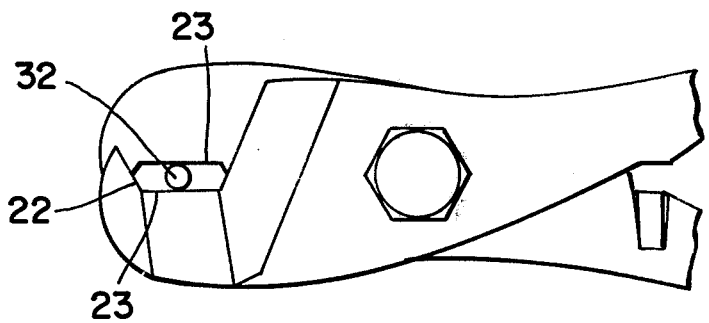
FIG_7
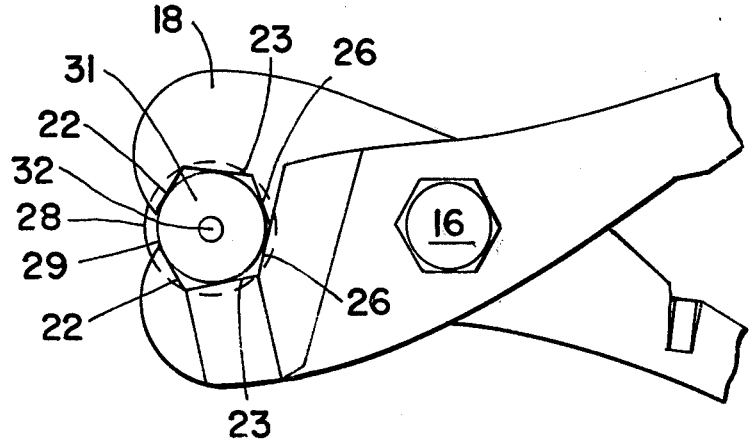
FIG_5

CUTTING TOOL FOR COAXIAL CABLE

BACKGROUND OF THE INVENTION

The present invention generally relates to a cutting tool for severing and dressing coaxial cable. The following patents best exemplify the prior art:

| | |
|---|---|
| DuBois | 1,586,297 |
| Rogoff | 2,745,178 |
| Carroll | 2,249,515 |
| Davis et al. | 2,660,783 |
| Townshend | 2,870,538 |
| Townshend | 3,012,321 |
| Bliznak | 3,461,555 |
| Hayes | 3,922,783 |

None of the tools disclosed in the prior art are specifically designed for cutting and dressing a coaxial cable. Coaxial cable presents unique problems in cutting, due to its nature and construction. A typical coaxial cable construction includes an outer tube of aluminium or the like which is sheathed in an insulator. A conductor extends coaxially through the tube, and the remaining volume of the tube is filled with a dielectric support material such as plastic foam material.

Prior art cable cutters, which all rely primarily on compression of the jaws for the cutting action, tend to compress and deform the outer tube. The tube must then be restored to its original circular cross-sectional configuration so that it may be received in standard fittings and connectors. This cutting procedure is wasteful of time and labor.

SUMMARY OF THE INVENTION

The present invention generally comprises a plier-type cutting tool which is specially adapted for cutting coaxial cable without deforming the cable tube, and without great effort. It includes a pair of longitudinally extending members each provided with opposed jaws at like ends thereof. A pivot member extends through the longitudinally extending members near the jaws to join them in plier configuration.

The confronting portion of each jaw includes a concave recess defined by three cutting edges, each cutting edge being linear and all being coextensive in the same plane. The cutting edge nearest the open end of the jaw is sharpest, and is provided to cut through the outer insulation and the cable tube. With the jaws open wide to receive a coaxial cable, all of the cutting edges impinge on the outer portion of the cable and aid in maintaining the proper shape of the cable as the outer portion is severed.

After the outer insulation and tube are cut, further cutting into the cable as the handles are squeezed causes the sharpest edges to mesh completely and disengage the cable. Thus the sharpest edges are protected from being nicked or dulled by contact with the coaxial conductor. The conductor is cut by the duller but tougher cutting edges which are disposed to apply a scissoring action to the conductor.

THE DRAWING

FIG. 1 is a plan view of the tool of the present invention, shown in the fully closed position.

FIG. 2 is an end view of the tool of the present invention, taken along line 2—2 of FIG. 1.

FIG. 3 is a cross-sectional view of the tool of the present invention, taken along line 3—3 of FIG. 1.

FIG. 4 is a partial plan view of the jaws of the tool in a partially open disposition.

FIG. 5 is a partial plan view of the jaws of the tool cutting the outer portion of a coaxial cable.

FIG. 6 is an end view of the tool in the disposition shown in FIG. 5.

FIG. 7 is a partial plan view of the jaws of the tool cutting the inner conductor of a coaxial cable.

DESCRIPTION OF THE PREFERRED EMBODIMENT

With reference to the accompanying drawing, and in particular FIG. 1, the coaxial cable cutting tool of the present invention includes a pair of similar handle members 11 and 12 which are provided with handle grips 13 and 14 at respective similar ends thereof. The handle members are joined near the jaw end 15 of the tool by a pivot member 16 extending therethrough in plier fashion. The member 12 is provided with a stop 17 extending upwardly therefrom to engage the member 11 and limit the closure of the tool.

At the jaw end 15 of the tool, the confronting surfaces of the handle members are planes 18 and 19 which are maintained in adjacent relationship by the pivot member 16. The extreme end of each handle member is provided with a curved outer surface 21, as shown in FIG. 2, which intersects the plane 18 or 19 at a linear cutting edge 22. Adjacent to the portion 21 is a planar surface 27 which extends obliquely to the planes 18 or 19 of the handle members. The planar surface 27 intersects the planes 18 or 19 at a linear cutting edge 23 which is coextensive with the cutting edge 22.

Adjacent to the portion 27 is a planar surface 24 extending obliquely to the planes 18 or 19 and intersecting these planes to form a linear cutting edge 26 which is coextensive with the cutting edges 22 and 23. The edges 22 and 26 of each jaw are opposed, describing an angle of approximately 45°. The three cutting edges of each jaw describe a concave recess in the jaw which is opposed to its counterpart recess. The two recesses together form an aperture which receives a coaxial cable when the jaws are fully opened. As shown in FIG. 5, a cable thus disposed is surrounded by six cutting edges, all of which impinge on the cable and aid in cutting the outer portion thereof.

It should be noted that the cutting edges 22 are sharpened to a higher degree than the edges 23 or 26. The edges 22 are particularly adapted to cut the outer insulation 28 and tube 29 of a coaxial cable. The tool is grasped at the handles and squeezed as the tool is rotated about the cable. The edges 22 cut into the insulation and tube, and the edges 23 and 26 widen and deepen the cut. The angular relationship of the cutting edges enables the tool to apply cutting pressure to the cable in a generally equilateral manner, thus maintaining the circular cross-sectional configuration of the cable.

After the insulation and tube of the cable are completely severed, the handles are closed further to cause the jaws to cut through the dielectric material 31 of the cable. This closure of the jaws causes the cutting edges 22 to mesh almost completely, thus disengaging these edges from contact with the conductor 32 of the cable and preventing damage to these sharp cutting edges. The edges 23 are at the same time brought into parallel confronting relationship, as shown in FIG. 7, with the conductor 32 therebetween. The edges 23, which are duller but tougher than the edges 22, apply a shearing force to the conductor which easily shears the conductor with moderate manual force on the handles.

The coaxial cable may thus be severed easily, without distorting its cylindrical shape, so that it may be used in conjunction with standard fittings and receptacles. The manner in which the different edges are provided with differing sharpness to effect severing of the various parts of a coaxial cable provides a superior cutting tool for its intended purpose. The generally equilateral disposition of the cutting edges with respect to the outer portion of the cable enables one to apply maximum compressive force to the cable when it is most needed, without distorting the cable.

We claim:

1. A cutting tool for cutting a cylindrical coaxial cable without substantial deformation, comprising a pair of lever members pivotally joined in plier fashion, each of said lever members including a jaw portion at one end thereof, said jaw portions being disposed in confronting relationship; each jaw including three linear cutting edges disposed coextensively and obliquely and defining a concave recess in the confronting edge of each jaw, said cutting edges of both jaws being disposed in confronting relationship to impinge generally equilaterally about an entire circumferential portion of said cylindrical cell.

2. The cutting tool of claim 1, wherein the distal of said three cutting edges of both jaw portions are sharpened to a greater degree than the others of said cutting edges to sever the outer sheath of said cable.

3. The cutting tool of claim 1, wherein the medial one of said three cutting edges of each jaw portion is duller than the other of said cutting edges to sever the coaxial conductor of said cable.

* * * * *